April 9, 1963     A. WULLSCHLEGER     3,084,786
PARKING MECHANISM FOR VEHICLES
Filed Aug. 15, 1960
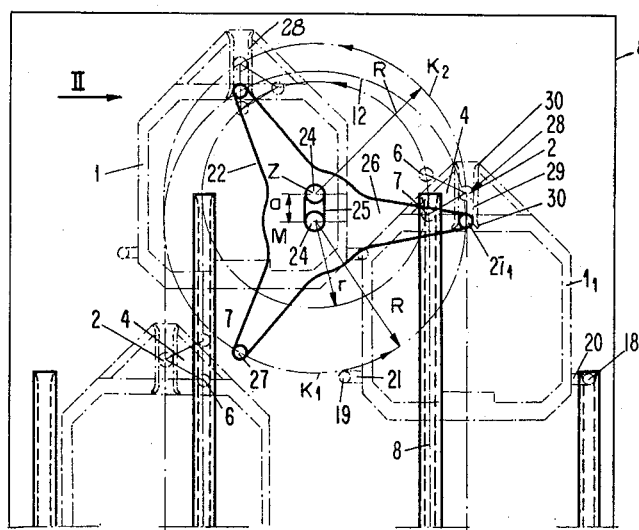
Fig.1
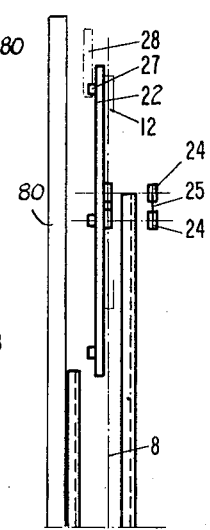
Fig.2
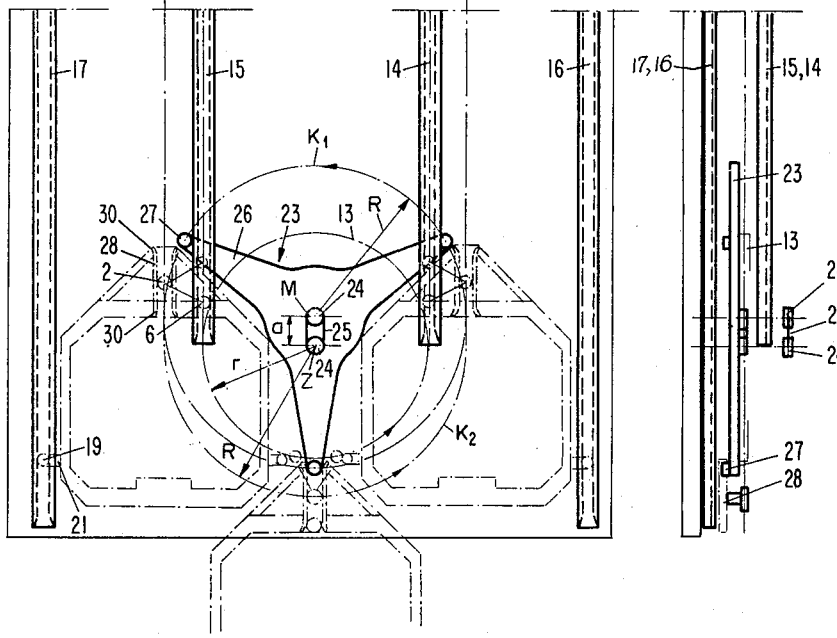

April 9, 1963 A. WULLSCHLEGER 3,084,786
PARKING MECHANISM FOR VEHICLES
Filed Aug. 15, 1960 5 Sheets-Sheet 2
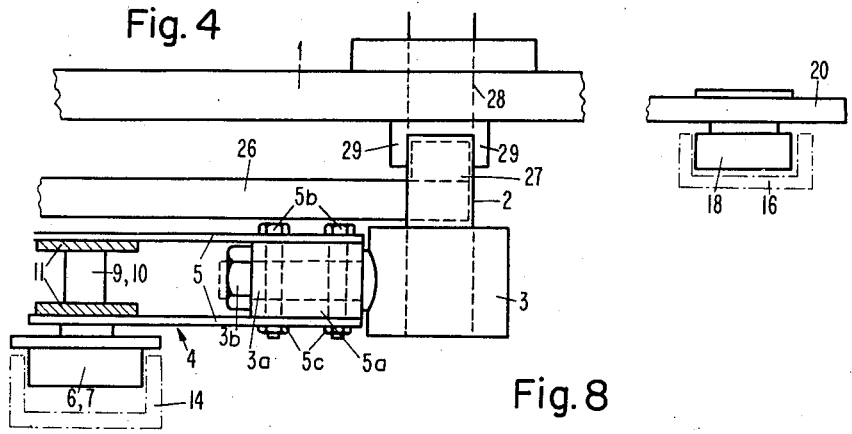
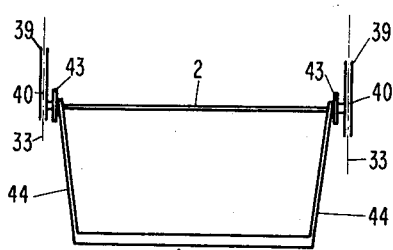
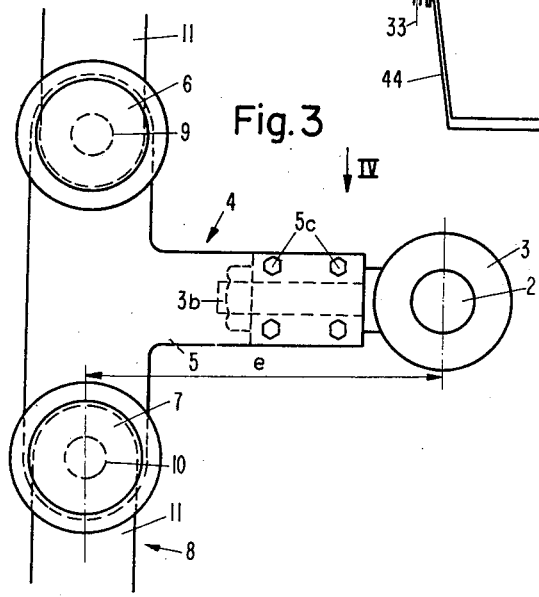
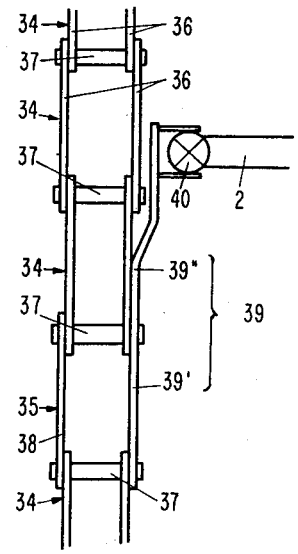

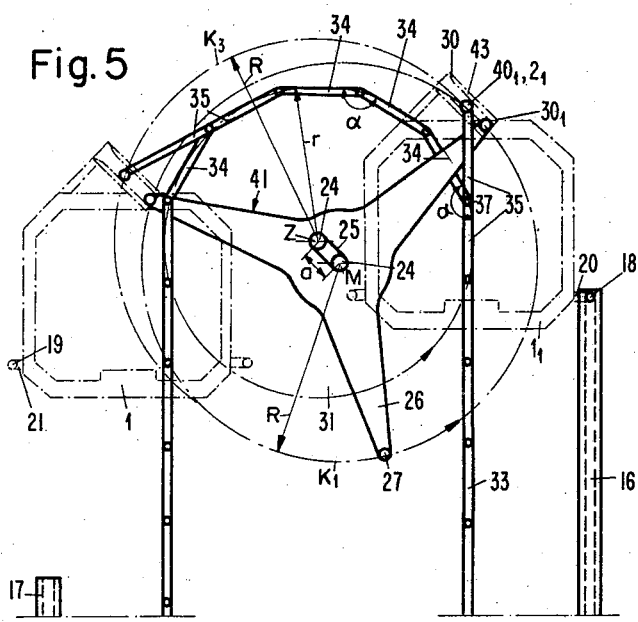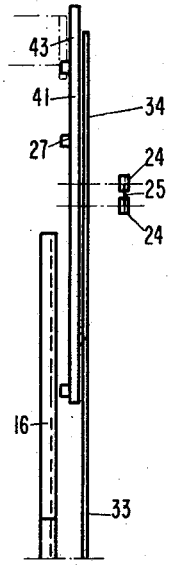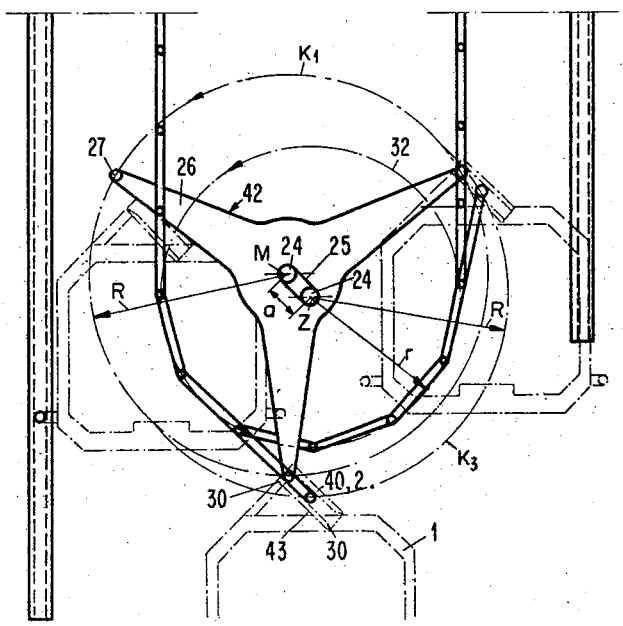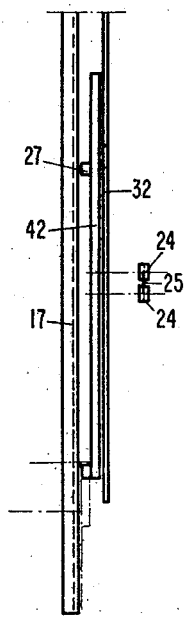
Fig. 5  Fig. 6

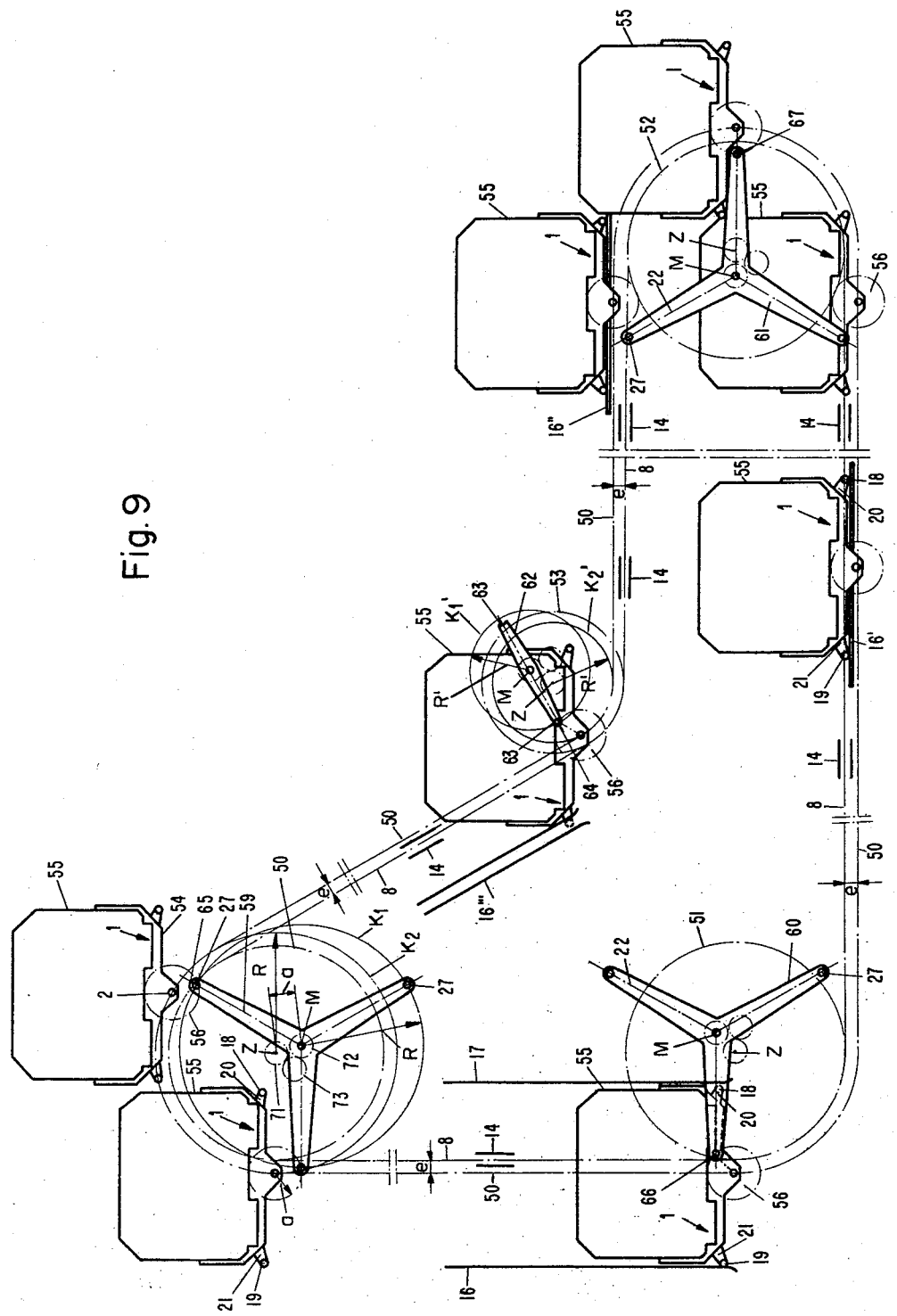

United States Patent Office 3,084,786
Patented Apr. 9, 1963

3,084,786
PARKING MECHANISM FOR VEHICLES
August Wullschleger, 26 Martin-Disteli-Strasse,
Olten, Switzerland
Filed Apr. 15, 1960, Ser. No. 49,580
Claims priority, application Germany Dec. 22, 1959
19 Claims. (Cl. 198—138)

The present invention relates to a parking mechanism for vehicles, particularly for automobiles, having two endless conveyer members guided over deflector wheels and connected to one another by suspension axles on which hang the cabins serving for taking-in the vehicles. With such devices it is necessary to prevent the cabins from swinging pendulum-fashion about their suspension axles while being deflected by the said deflector wheels. The measures hitherto proposed or carried out for this purpose, which include for example arcuate guides, are rather complicated and expensive, without even always operating satisfactorily.

The invention has the primary object of solving the problem of obviating such pendulum-fashion swinging in a simple and reliable way.

With this and other objects in view which will become apparent later from this specification and the accompanying drawings, I provide a parking mechanism for vehicles such as automobiles, comprising in combination: a stationary structure, at least two deflector wheels journalled in said structure, endless conveyer means passed parallel to each other over the said deflector wheels and having suspension axles connecting said conveyer means to one another, cabins for the accommodation of the vehicles suspended on the said suspension axles, an auxiliary wheel having at least one lateral projection and journalled on the said structure adjacent to and at a predetermined offset from each of the said deflector wheels and geared to its associated deflector wheel for synchronous rotation in the same sense, the axes of all of the said deflector wheels and associated auxiliary wheels being parallel to one another, the said projection having a radial distance from the center of its auxiliary wheel equal to the radius of a circular arc described by the suspension axles of a cabin when passing over the associated deflector wheel, an entry member mounted on at least one end face of a cabin and offset from the suspension axles thereof an amount and a direction equal to those of the centers of the said deflector wheel and associated auxiliary wheel, said entry member engaging said projection while on its path along the said circular arc on the deflector wheel.

Preferably the said cabins are open on top and have end walls sloping down inwardly towards one another. The connection of said cabins to said conveyer means is preferably effected by universal joints.

These and other features of my said invention will be clearly understood from the following description of three embodiments thereof given by way of example with reference to the accompanying drawings, in which:

FIG. 1 is an elevation of the drive- and guide-mechanism of a first embodiment of the parking device according to the present invention;

FIG. 2 is a view in the direction of the arrow II—II of FIG. 1;

FIG. 3 shows a suspension means for a cabin according to FIG. 1, but on a larger scale;

FIG. 4 is a plan view of the said suspension means in the direction of the arrow IV of FIG. 3;

FIG. 5 is an elevation of the drive- and guide-mechanism of a second embodiment of the parking device according to the present invention;

FIG. 6 is a view in the direction of the arrow VI of FIG. 5;

FIG. 7 is a diagrammatic side elevation of a section of an endless chain as used in this second embodiment, on a larger scale.

Figure 11:
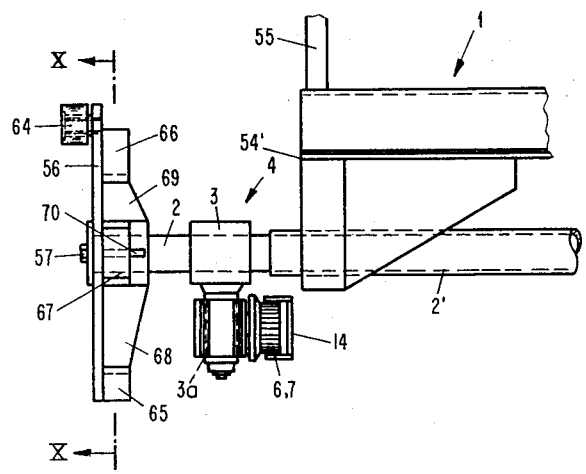
Figure 12:
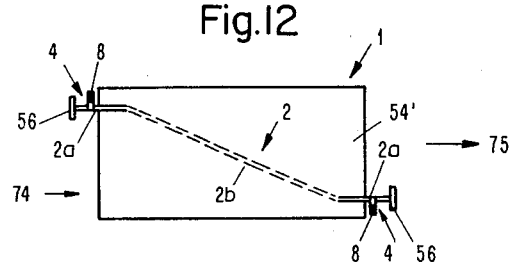
Figure 10:
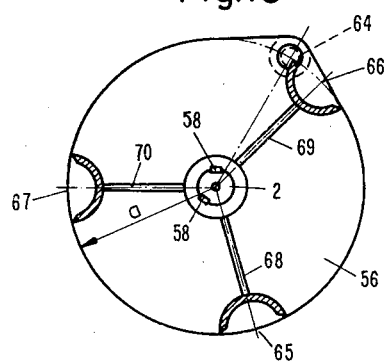

FIG. 8 is a diagrammatic side elevation of a modified cabin of this second embodiment, FIG. 9 is a diagrammatic elevation of the drive- and guide-mechanisms of a third embodiment of a parking mechanism according to the invention, FIG. 10 is a section of an engagement disc provided on a cabin of the arrangement according to FIG. 9, on line X—X of FIG. 11, FIG. 11 is a section on the line XI—XI of FIG. 9, on a large scale, and FIG. 12 is a diagrammatic view from below on the bottom of a cabin according to a modification.

The parking mechanism illustrated in FIGS. 1 to 4 comprises a number of cabins 1, each designed for accommodating one automobile or alternatively a number of smaller vehicles. Obviously the cabins need not be closed on all sides and may each consist of a platform which by means of more or less open walls is suspended on a suspension axle 2 arranged above the cabin 1. Each end of this axle 2 is journalled in a bearing 3 of a suspension means 4. This suspension means 4 shown in FIGS. 3 and 4 on a larger scale has a T-shaped double link 5 which at the foot of the T carries the bearing 3, and at the end of the cross bar of the T is provided with two guide rollers 6 and 7.

The double link 5 forms a special link of an endless conveyer means, in the embodiment illustrated of an endless chain 8, and is connected by pins 9, 10 to the adjacent normal links 11 of this chain 8. The bearing 3 is provided with a swivel axle 3a, which is perpendicular to the axle 2 and is journalled in a bearing 5a attached to the double link 5 by means of screws 5b and nuts 5c. A nut 3b is screwed to the end of the axle 3a in order to secure the same in the bearing 5a.

This universal joint at the end of the axle 2 consisting in the bearings 3, 5a has been provide, because this axle 2 is suspended at its ends in the usual manner on two endless chains 8 moving synchronously, the two suspension means 4 of the axle 2 however practically not always lying on exactly the same level. In FIG. 1 the suspension means 4 have been diagrammatically indicated as triangles, at the corners of which the guide rollers 6 and 7 and the suspension axle 2 are shown.

The chain 8 indicated in FIGS. 1 and 2 is passed over two sprocket wheels 12, 13 lying one above the other, of which in FIG. 1 only the pitch circles are drawn, and of which one is driven while the other one is attached to a chain-tensioning device. The drive and the tensioning device are well known and consequently not illustrated.

Along the vertical strands of the chain 8 there are provided guides 14, 15 designed as U-profile rails, in which the said guide rollers 6 and 7 are guided in order to take the torque applied to the link 5 by the cabin load. In order to prevent any pendulum-like swinging of the cabins 1 about their suspension axles 2, guides 16 and 17, likewise formed by U-profile rails, are provided along the vertical strands of the chain 8, into which rails guide rollers 18 and 19 may engage, which are mounted on short arms 20 and 21 extending outwardly laterally from the cabin 1. The guides 14, 15, 16, and 17 are secured by any suitable fastening means to a supporting structure or frame 80 which may be of any conventional arrangement. The supporting structure 80 also provides means for rotatably supporting, as by journal bearings, the axles Z of the sprocket wheels 12 and 13.

When the suspension means 4 of a cabin is at one of the sprocket wheels 12 or 13, the torque applied by the cabin load is taken by said sprocket wheel through the intermediary of the chain pins 9 and 10. Consequently any guidance of the rollers 6 and 7 during the deflection of the cabin by a sprocket wheel is unnecessary. On the other hand measures are required for preventing the cabin from swinging pendulum-fashion while being thus deflected, inasmuch as the cabin then particularly tends to swing owing to its change of direction. In order to obviate such swinging in a very simple manner, two star wheels 22 and 23 are provided, which are geared to one another and to the wheels 12 and 13 by means of sprocket wheels 24 and chains 25 for rotation in the same sense and at the same speed. Instead of the sprocket wheels 24 alternatively gear wheels of identical diameters may be provided, which are geared to one another kinematically through an idler gear wheel meshing with both of them.

Each of the star wheels 22 and 23 has three arms 26 offset 120° from one another, which are provided at their ends with pins 27 parallel to the axis of the star wheel. On the cabin 1 at each end of the suspension axle 2 a vertical U-profile rail 28 (see FIG. 4) is attached, through the web of which passes the suspension axle 2. The two flanges 29 of the U-profile rail 28 are slightly flaring outwardly at their ends 30, as indicated in FIG. 1. The radius R of the circle $K_1$ described by the pins 27 of the star wheel 22 is equal to the radius of the semi-circle $K_2$ described by the suspension axles 2 at the deflection of the chain 8 by the sprocket wheel 12. This radius R is equal to the radius $r$ of the sprocket wheel 12 plus the distance $e$ (see FIG. 4) between the bearing 3 or suspension axle 2 and the chain 8, which distance $e$ represents the eccentricity of the suspension axles 2 relative to the chain 8.

As long as the cabin 1 moves vertically upward, it has the velocity $r \times w$, wherein $w$ is the angular velocity of the sprocket wheels 12, 13 and star wheels 22, 23. The pins 27 move on the circle $K_1$ at a higher velocity, namely of $R \cdot w$. The position of the arms 26 of the star wheel 22 relative to the cabins 1 suspended by the suspension means 4 on the chain 8 has been chosen in such a manner that at the beginning of the deflection a pin 27 catches up with the U-profile rail 28 attached to the cabin 1, and enters into the lower end thereof, the aforesaid slight flaring of the flanges 29 of this rail 28 facilitating the entry. The position of the cabin and of the pin at which this just happens has been denoted in FIG. 1 by the characters $1_1$ and $27_1$. In this position the pin 27 has a distance from the suspension axle 2 which is equal to the distance $a$, at which the center Z of the sprocket wheel 12 lies above the center M of the star wheel 22. While the suspension axles 2 describes the semi-circle $K_2$, the pin 27 describes at the same velocity the upper half of the circle $K_1$. Consequently during this semi-circular movement the relative position of the pin 27 to the suspension axle 2 remains unaltered. After the termination of the semi-circular movement and when the cabin begins to descend vertically downward, the pin 27 precedes the U-profile rail 28 and accordingly emerges from the lower end 30 of this rail 28.

During the semi-circular movement the pin 27 by its engagement into the lower end of the rail 28 prevents any pendulum-fashion swinging of the cabin 1 in that it maintains positively a vertical position of the rail 28. At the beginning of the downward movement the guide roller 19 enters into the guide rail 17 in order to take over the securing against pendulum-movements, while the guide rollers 6 and 7 enter into the guide rail 15 so as to take the torque applied by the cabin load.

During the deflection of the cabin 1 by the lower deflector wheel 13 the same process occurs, merely with the difference that the pin 27 of the lower star wheel 23 does not enter into the lower but into the upper ends 30 of the U-profile rails 28 in that the star wheel 23 is a distance $a$ above, rather than below, the sprocket wheel 13.

It will be seen that the vertical U-profile rails 28 are merely provided for reasons of structural simplicity, that the pins 27 have only to enter into the inlets formed at the ends 30 of these rails but need not slide along said rails 28 except for small values corresponding to the tolerances of the structural assembly.

In the parking mechanism according to the FIGS. 5 to 8, an endless chain 33 runs over the sprocket wheels 31 and 32, which apart from normal chain links 34 has extended suspension chain links 35. A section of the chain 33 is shown in FIG. 7 diagrammatically on a larger scale. The ordinary chain links each have in the usual way two link webs 26 which at their ends are connected by a link pin 37 to the ends of the links webs of the adjacent chain links. The suspension chain link 35 has one link web 38 of equal length with the normal link webs 36, and an extended link web 39, which has a section 39' corresponding to the normal link web 38 (or link webs 36) and a section 39" protruding beyond one chain joint axis, to the free end of which section 39" a universal joint 40 is attached, wherein one end of the suspension axle 2 of the cabin 1 is journaled.

In the vertical strands of the chain 33 the suspension chain link 35 is in alignment with the adjacent normal chain links 34, so that the cabin load does not act eccentrically on the chain 33 as in the first embodiment, but centrally. Consequently no guide means is required for taking any torque applied by the cabin load. For preventing any pendulum movements of the cabins 1 on the vertical strands of the chains however the guide rails 16 and 17 are provided as before, into which engage rolls 18 and 19, respectively, which are arranged laterally on the cabin 1.

In order to prevent pendulum movements of the cabin while being deflected, again star wheels 41 and 42 are provided. The center M of the upper star wheel 41 is offset relative to the center Z of the upper sprocket wheel not only downwardly but also laterally (in FIG. 5 towards the right), while the center M of the lower star wheel 42 is offset from the center Z of the lower sprocket wheel 32 not only upwardly but also towards the other side (to the left in FIG. 5). The absolute amounts by which the upper and lower centers of the star and sprocket wheels are offset from one another in opposite directions are equal.

On the vertical strands of the chain 33 the cabin 1 or its suspension axle 2, respectively, has a horizontal distance from the centers Z of the sprocket wheels 31 and 32, which is equal to the radius $r$ of these sprocket wheels. At the upper deflection the suspension axle 2 maintains this distance until the suspension chain link 35 concerned is deflected by the sprocket wheel 31, then, however, the universal joint 40 or the suspension axle 2, respectively, are at a considerably higher level than the center Z of the sprocket wheel; this position is denoted $40_1$, $2_1$ in FIG. 5. Then the universal joint 40 starts describing a semi-circle about the center Z, the radius R of which depends on the angle $\alpha$ included by two adjacent chain links 34 and 34 or 34 and 35 on the sprocket wheel 31, and on the length of the link web 39 of the suspension chain link 35.

The star wheel 41 has again three arms 26 with pins 27 mounted at their outer ends, and the radius of the circle $K_1$ described by these pins 27 is equal to the aforesaid radius R. Likewise a U-profile rail 43 is attached on top of the cabin 1 which however—in contrast to the U-profile rail 28 of FIG. 1—is not vertical but includes an angle of approximately 45° with the vertical. The ends of the flanges of this U-profile rail form again entries 30, into which the pins 27 may engage. Since the pins 27 move at the velocity $R \times w$, while the cabin 1 up to the position $2_1$ of its suspension axle moves only at the velocity $r \times w$, at the relative position assumed of the star wheel 41 and the chain 33 a pin 27 is just about to enter the entry 30 in the position $30_1$ illustrated. The pin 27 accordingly prevents pendulum movements of the cabin 1 as long as the universal joint 40 moves on the semi-circular arc $K_3$.

The distance between the entry 30 and the universal joint 40 is again equal to the distance *a* between the centers Z and M.

After half a revolution of the sprocket wheel 31 the suspension chain link 35 is again in a vertical position, while on the other hand the universal joint 40 is now below the center Z, and the pin 27 precedes the entry 30 so that it emerges from it. This position is not illustrated in FIG. 5, wherein on top two consecutive cabins 1 are shown. Since the guide rail 17 takes over the restraining against pendulum movements only from a moment at which the cabin 1 is at a lower level than the position denoted $1_1$, said rail is offset downwardly relative to the guide rail 16.

During deflection at the lower sprocket wheel 32 the same operations recur, with the difference only that the pins 27 enter into the upper entries 30 formed by the ends of the flanges of the U-profile rails 43, instead of entering the lower entries thereof.

For the synchronised drive of the star-wheels 41, 42 and sprocket wheels 31, 32, respectively, likewise sprocket wheels 24 and chains 25 (or equivalent means) are provided.

In FIG. 8 it is shown diagrammatically how the cabin 1 is suspended by means of the suspension axle 2 on both endless chains 33, indicated in chain-dotted lines, it being assumed that the cabin 1 is on the descending vertical strand of the chain, so that the ends of the link webs 39 provided with the universal joints 40 are directed downwardly. The end walls 44 of the cabin 1 are not vertical but are closer to one another at the bottom than on the top, and moreover the cabin 1 is open on top. These measures permit to attach the cabins 1 at a shorter distances from one another to the chains 33, since when deflecting a cabin 1, the lateral edge of the bottom thereof temporarily can enter a little between the upper portions of the end walls 44 of the adjacent cabin. Moreover these measures, which are applicable also to the embodiment according to FIGS. 1 to 4, allow to build the cabin lighter and less expensively. In particular the length of the cabin floor is shortened, which takes into account the fact that with automobiles the wheel base is considerably shorter than the overall length between the front and rear bumpers lying at a higher level. With vertical end walls the floor would accordingly be unnecessarily long and would have to be dimensioned for unnecessarily high bending moments.

The chains may be passed over more than two deflector sprocket wheels if desired, certain distances between these sprocket wheels being horizontal or inclined, as the case may be. It may then also happen that one deflector wheel touches the chain from outside instead from inside; in this case the associated star wheel is naturally also outside the closed line of the chains. Along non-vertical strands of the chains guide rails 35 have to be provided even for chains having extended suspension links, in order to take the torque moment applied by the cabin load, and corresponding guide rollers have to be provided on the cabins.

The axle 2 need not necessarily be arranged above the cabin 1 in such a manner that the latter is suspended on the axle. The axle 2 may alternatively pass below the bottom of the cabin, any tipping of the cabin being prevented by the same means described in detail hereinabove which prevent the pendulum-like swinging of the cabin. This will now be explained in more detail with reference to FIGS. 9 to 11.

FIG. 9 diagrammatically shows an elevation of the driving and guiding mechanisms of a third embodiment of the parking mechanism according to the present invention which largely corresponds to the first embodiment described, the endless chain 8 being however passed—as shown—over four deflector wheels 50–53. Between the wheels 50 and 51 the chain 8 runs vertically, between the wheels 51 and 52, and between 52 and 53 horizontally, and between the wheels 53 and 54 inclined to the horizontal. The chain 8 may circulate in one sense or the other. The cabin 1 is arranged above the axle 2, which is rigidly connected, preferable welded, to the bottom 54' of the cabin (see also FIG. 10). The axle may be constituted mainly by a tube 2' in the ends of which trunnions are inserted. At the end of the cabin 1 a profile gauge 55 is arranged to mark the permissible profile beyond which an automobile parked on the cabin floor 54' must not protrude. The axle 2 is again connected at both ends with one of the two chains 8, by means of a suspension device 4 of the kind illustrated in FIG. 4, the axle 2 passing however through the bearing 3 instead of terminating in the same. To the end of the axle 2 an engagement disc 56 is rigidly connected, for example by the use of a screw 57 and two keys 58 (see FIG. 10). The engagement disc 56 replaces the U-profile rail 29 forming the two seats 30 and fixed directly to the cabin of the first embodiment, in that in the present case four seats have to be provided as will be explained in more detail hereinafter. To each sprocket wheel 50 to 53 a star wheel 59 to 62 is associated, the center M of which is offset the amount *a* from the center Z of the respective sprocket wheel. The radius R of the circle $K_1$ described by the projections 27 formed by pins of the mutually identical star wheels 59 to 61 is again equal to the radius R of the circular arc $K_2$ described by the end of the axle 2 when being deflected around the sprocket wheel 50, 51 or 52, respectively. The same applies also to the star wheel 62 associated with the sprocket wheel 53. The star wheel 62 has only two arms at the ends of which recesses 63 are provided at a spacing R' from one another, which may be considered as negative projections. The recess 63 co-operates with a pin 64 of the engagement disc 56 to be considered a negative seat. The interengaging elements 63, 64 are equivalent to the elements 27, 30 of the other embodiment. The radius R' of the circle $K_1'$ is equal to the radius R' of the circular arc $K_2'$ extending over about 60° described by the axle 2 on the sprocket wheel 53. Since the sprocket wheel 53 is outside the chain 8, the radius R' is smaller by the eccentricity *e* of the suspension device 4 (see FIG. 11) than the radius of the pitch circle of the sprocket wheel 53.

In addition to the pin or negative seat 53 the engagement disc 56 is provided also with three positive seats 65, 66 and 67 which are arranged at the ends of three ribs 68, 69 and 70, respectively. The engagement discs 56, indicated in FIG. 1 only by a circle of the radius *a*, remain during the whole cycle movement of the cabins always in the same position relative to the vertical. The projections 27 of the uppermost star wheel 59 engage into the seats 65 of the engagement discs 56 of consecutive cabins 1. The projections 27 of the star wheels 60 and 61 engage into the seats 66 and 67, respectively, of the engagement discs 56, and the recesses 63 of the star wheel 62 come into engagement with the pins 64, as already stated.

For the guidance of the rollers 6 and 7 of the suspension device 4 again stationary U-profile rails 14 are provided along the straight stretches of the chain, of which in FIG. 9 short sections only are illustrated. For the guidance of the chain rollers 18 and 19 two rails 16 and 17 are provided at the vertical stretch of the chain; a horizontal rail 16' is provided at the lower horizontal stretch of the chain; a horizontal rail 16'' is provided at the upper horizontal stretch of the chain; and a U-profile rail 16''' is provided at the inclined stretch of the chain. Of the rails 17 and 16 to 16''' likewise sections only have been shown in order not to encumber the figure.

The synchronous rotation in the same rotational sense of the star wheels and corresponding sprocket wheels is effected by means of three gear wheels 71 to 73, of which in FIG. 9 the pitch circles only are shown. The gear wheels 71 and 72 are mounted on the axles of the sprocket wheel (e.g. 50) or star wheel (e.g. 59) and mesh with a common transmission gear wheel 73.

The cabins 1 are loaded with automobiles and also discharged, for example in their highest position, so that the present device is excellently suitable for the underground parking of automobiles.

It may happen that the star wheel associated with a sprocket wheel has only a single arm with a positive or negative projection. This may be the case particularly with deflector sprocket wheels, for which the deflection arc is substantially smaller than 180°. Obviously star wheels having more than three arms and a corresponding number of projections formed by pins or otherwise may be used.

It should moreover be remarked that the offset between the centers M and Z need not necessarily be equal at the various deflection points such as assumed in the FIG. 9. In this case naturally the various seats of the engagement discs 56 will also have different distances from the suspension axles, which distances are equal to the corresponding center offsets. With small cabins it suffices when the star wheels and guides serving for the prevention of their swinging pendulum-wise are provided on one end face only of the cabin.

Finally FIG. 12 shows that the axle 2 passing below the floor 54' of the diagrammatically shown cabin 1 and fixedly connected therewith need not necessarily be straight but may have two parallel terminal sections 2a offset from one another, at the ends of which the engagement discs 56 are fixed. Then the two mutually offset sections 2a of the axle may or may not be connected to one another by an oblique section of the axle as indicated in dotted lines. The sections 2a pass through corners of the floor 54' lying almost diagonally opposite one another.

This has the advantage that on the vertical stretches of the cycle the chains 8 do not any more pass approximately past the middle of the cabin. One may accordingly provide at any point desired of a vertical stretch of the cycle an entry or exit for the cabin 1, in the sense of the arrows 74 and 75, respectively, without being disturbed by the chains 8.

While I have described herein and illustrated in the accompanying drawings what may be considered typical and particularly useful embodiments of my said invention, I wish it to be understood that I do not limit myself to the particular details and dimensions described and illustrated; for obvious modifications will occur to a person skilled in the art.

What I claim as my invention and desire to secure by Letters Patent is:

1. A parking mechanism for vehicles such as automobiles, comprising in combination: a stationary structure, at least two deflector wheels journalled in said structure, endless conveyer means passed parallel to each other over the said deflector wheels and having suspension axles connecting said conveyor means to one another, cabins for the accommodation of the vehicles suspended on the said suspension axles, an auxiliary wheel having lateral projection means and journalled on the said structure adjacent to and at a predetermined offset from each of the said deflector wheels and operatively connected to its associated deflector wheel for synchronous rotation in the same sense, the axes of all the said deflector wheels and associated auxiliary wheels being parallel to one another, the said projection means having a radial distance from the center of its auxiliary wheel equal to the radius of a circular arc described by the suspension axle of a cabin when passing over the associated deflector wheel, and entry member fixedly mounted on at least one end face of a cabin and offset from the suspension axle thereof an amount and a direction equal to those of the centers of the said deflector wheel and associated auxiliary wheel, said entry member engaging said projection means while on its path along the said circular arc on the deflector wheel.

2. A parking mechanism as claimed in claim 1, wherein the said auxiliary wheel is a star wheel, having radial arms, and wherein the said lateral projection means are pins parallel to the axis of the said star wheel and arranged at the free ends of the said arms.

3. A parking mechanism as claimed in claim 1, comprising stationary guides attached to the said structure parallel to the said conveyer means between the said deflector wheels, and comprising guide rollers journalled laterally on the said cabins and in operation engaging the said guides while their cabin moves between two deflector wheels.

4. A parking mechanism as claimed in claim 1, wherein the said cabins are open on top and have end walls sloping downwardly towards one another.

5. A parking mechanism as claimed in claim 1, wherein the said entry members are U-profile rails attached to the said cabins having flanges flaring outwardly at their ends.

6. A parking mechanism as claimed in claim 1, wherein the said deflector wheels are sprocket wheels and the said conveyer means are endless chains running over the said sprocket wheels.

7. A parking mechanism as claimed in claim 6, wherein the said endless chains have ordinary links and T-shaped links each having a T-bar and a foot, guide rollers journalled on the end of the T-bar of said T-shaped links, a universal joint arranged on the foot of the said T-shaped links, the said suspension axles being articulated to the said T-shaped links by the said universal points, and guide rails attached to the said stationary structure parallel to the said chains between the said sprocket wheels and engaged by the said guide rollers journalled on the said T-links.

8. A parking mechanism as claimed in claim 6, wherein the said endless chains have ordinary links and links having an extended link web, a universal joint mounted at the end of each of the said extended webs and articulating an end of one of the said suspension axles to the said chains.

9. A parking mechanism for vehicles such as automobiles, comprising in combination: a stationary structure, at least two deflector sprocket wheels journalled in said structure, two endless conveyor chains running side by side over the said deflector sprocket wheels and having ordinary links and T-shaped links, each T-shaped link having a T-bar portion, guide rollers journalled at the end of said T-bar portion, and a T-foot, a universal joint arranged at this T-foot, suspension axles articulated at each end by one of said universal joints to one of said conveyor chains, a cabin for the accommodation of a vehicle suspended on each of said suspension axles, guide rollers journalled laterally on the said cabins, fixed guide rails fitted in pairs to the said structure parallel to the connecting line of the centers of two deflector sprocket wheels, one pair of said guide rails being engaged by the said guide rollers on said T-links and taking the torque moment applied by the cabin loads, and another pair of guide rails being engaged by the said guide rollers on said cabins, and preventing any pendulum movements thereof, star wheels each associated with one of the said deflector sprocket wheels journalled in the said stationary structure offset a predetermined distance from their associated sprocket wheel in opposite directions on the said connecting line of the centers of said sprocket wheels, each star wheel having arms and lateral pins extending from the ends of said arms, and entry members fixed attached to the said cabins, each entry member being a U-profile rail parallel to the said connecting line and having flaring ends engaging in operation the said pins of said star wheels while moving over the said deflector sprocket wheels, the said pins having a radial distance from the center of their star wheel equal to the radius of said sprocket wheel plus the length of the said T-foot of said T-links, each of said star wheels being operatively connected to its associated deflector sprocket wheel for synchronous rotation in the same sense.

10. A parking mechanism for vehicles such as automobiles, comprising in combination: a stationary structure, at least two deflector sprocket wheels journalled in said structure, two endless conveyor chains running side by side over said deflector sprocket wheels and having ordinary links and links having an extended link web, a universal joint carried at the end of each of the said extended link webs, suspension axles articulated at each end by one of the said universal joints to one of said conveyor chains, a cabin for the accommodation of said vehicles suspended on each of the said suspension axles, guide rollers journalled laterally to the said cabins, fixed guide rails fitted in pairs on the said structure parallel to the connecting line of the centers of two deflector sprocket wheels, and being engaged by the said guide rollers on the said cabins and preventing any pendulum movements thereof, star wheels each associated with one of the said deflector sprocket wheels journalled on the said stationary structure offset a predetermined distance from their associated deflector sprocket wheel at an angle to the said connecting line in opposite directions, each star wheel having arms and a lateral pin extending from each arm, and entry members fixedly attached to each cabin at an angle to the said connecting line equal to that of the offset of the said star wheels therefrom, the said entry members being U-profile rails having flanges flaring at their ends and engaging the said lateral pins while moving over the said deflector sprocket wheels, said star wheels being operatively connected to their associated conveyor sprocket wheels for synchronous rotation in the same sense.

11. A parking mechanism for vehicles such as automobiles, comprising in combination: a stationary structure, a plurality of deflector wheels journalled in said structure about parallel axes, some of the connecting lines of the said axes being vertical, some horizontal, some inclined, endless conveyor means passed parallel to one another over the said deflector wheels and having suspension axles connecting said conveyor means to one another, cabins for the accommodation of said vehicles suspended on the said suspension axles, auxiliary wheels journalled on the said structure, each being associated with and offset a predetermined distance from one of the said deflector wheels and being operatively connected to its associated deflector wheel for synchronous rotation in the same sense, each of the said auxiliary wheels having projection means at a radial distance exceeding the radius at which said suspension axles move over the said deflector sprocket wheels by a predetermined amount, entry members fixedly attached to the said cabins in directions parallel to the said offsets of the auxiliary wheels from their associated deflector sprocket wheels, each of the said entry members being a profile rail flaring at its ends and engaging said projection means of the said auxiliary wheels while moving over the said deflector sprocket wheels, guide rails attached in pairs to the said fixed structure parallel to the said connecting lines between centers of deflector sprocket wheels, guide rollers journalled on said cabins engaging some of the said pairs of guide rails and preventing the said cabins from swinging pendulum fashion, and guide rollers journalled on some of the said conveyor means at an offset therefrom and engaging other pairs of said guide rails, transmitting torque moments from the said cabins to the said stationary structure.

12. A parking mechanism for vehicles such as automobiles, comprising in combination: a stationary structure, at least two deflector wheels journalled in said structure, endless conveyer means passed parallel to each other over the said deflector wheels and having suspension axles connecting said conveyor means to one another, cabins having floors for the accommodation of the vehicles fixedly connected to the said axles, the said axles passing below the said floors of the cabins, an auxiliary wheel having lateral projection means and journalled on said structure adjacent to and at a predetermined offset from each of the said deflector wheels and being operatively connected to its associated deflector wheel for synchronous rotation in the same sense, the axes of all the said deflector wheels and associated auxiliary wheels being parallel to one another, the said projection means having a radial distance from the center of its auxiliary wheel equal to the radius of a circular arc described by the suspension axles of a cabin when passing over the associated deflector wheel, a seating member fixedly mounted on at least one end face of a cabin and offset from the suspension axles thereof an amount and direction equal to those of the centers of the said deflector wheel and associated auxiliary wheel, said seating member engaging with said projection means while on its path along said circular arc on the deflector wheel.

13. A parking mechanism as claimed in claim 12, wherein the said seating members comprise engagement discs mounted on the ends of said axles and having positive and negative recesses, the said auxiliary wheel having positive and negative projections, co-operating with the said positive and negative recesses, respectively.

14. A parking mechanism as claimed in claim 12, wherein the said axles has two terminal sections parallel to and offset from one another.

15. A parking mechanism as claimed in claim 14, wherein the said terminal sections are arranged adjacent two diagonally opposite corners of the said cabin floor.

16. A parking mechanism for vehicles comprising deflector wheel means, endless conveyor means moving synchronously over said deflector wheels, cabin suspension means including platform means on said endless conveyor means, second wheel means disposed adjacent to said deflector wheel means, projection means on said second wheel means, center points on said deflector wheel means and said second wheel means being connected for movement in the same general direction, said center points being spaced from each other whereby said projection means travels on a deflection arc having limits defined by radii from said center points to said projection means, and means on said platform means to be engaged by said projection means for movement thereby.

17. The combination as recited in claim 16 wherein said means on said platform means comprises a vertical U-profile rail.

18. The combination as recited in claim 16 wherein said means on said platform means comprises a U-profile rail having an incline with respect to a vertical line.

19. The combination as recited in claim 16 wherein said means on said platform means comprises axle means disposed beneath said platform means.

References Cited in the file of this patent
UNITED STATES PATENTS

| 845,984 | Thompson | Mar. 5, 1907 |
| 2,955,718 | Messick | Oct. 11, 1960 |

FOREIGN PATENTS

| 1,093,611 | France | Nov. 24, 1954 |